US010650058B2

(12) United States Patent
Conrad et al.

(10) Patent No.: US 10,650,058 B2
(45) Date of Patent: May 12, 2020

(54) INFORMATION RETRIEVAL SYSTEMS WITH DATABASE-SELECTION AIDS

(71) Applicant: Thomson Reuters Global Resources, Baar (CH)

(72) Inventors: Jack G. Conrad, Eagan, MN (US); Joanne R. S. Claussen, Eagan, MN (US)

(73) Assignee: Thomson Reuters Enterprise Centre GmbH, Zug (CH)

( * ) Notice: Subject to any disclaimer, the term of this patent is extended or adjusted under 35 U.S.C. 154(b) by 545 days.

(21) Appl. No.: 15/461,907

(22) Filed: Mar. 17, 2017

(65) Prior Publication Data

US 2017/0192969 A1    Jul. 6, 2017

Related U.S. Application Data

(60) Continuation of application No. 14/034,077, filed on Sep. 23, 2013, now Pat. No. 9,626,406, which is a
(Continued)

(51) Int. Cl.
*G06F 16/24* (2019.01)
*G06F 16/93* (2019.01)
(Continued)

(52) U.S. Cl.
CPC ............ *G06F 16/93* (2019.01); *G06F 16/245* (2019.01); *G06F 16/2457* (2019.01); *G06F 16/24575* (2019.01); *G06F 16/951* (2019.01)

(58) Field of Classification Search
CPC .............. G06F 16/245; G06F 16/2457; G06F 16/24575; G06F 16/93; G06F 16/951
(Continued)

(56) References Cited

U.S. PATENT DOCUMENTS 4,964,063 A    10/1990  Esch
5,555,403 A    9/1996   Cambot et al.
(Continued)

OTHER PUBLICATIONS

Conrad, J. et al., "The New Westlaw Directory—White Paper on Browse + Search Features," Version 1.3, West Group (2001) pp. 1-14.
(Continued)

*Primary Examiner* — Kimberly L Wilson
*Assistant Examiner* — Nirav K Khakhar
(74) *Attorney, Agent, or Firm* — Norton Rose Fulbright US LLP

(57) ABSTRACT

A method for enabling a user to search database profiles includes receiving user input categorizing an information need, and determining whether the user input corresponds to a first or a second type of category. In response to determining that the user input corresponds to the first category type, the method includes requesting user input defining a first query, and in response to receipt of the query, and executing the defined first query against a set of one or more databases based on the user input categorizing the information need. In response to determining that the user input corresponds to the second category type, the method includes requesting additional user input regarding the information need.

17 Claims, 7 Drawing Sheets

Related U.S. Application Data division of application No. 10/916,116, filed on Aug. 11, 2004, now Pat. No. 8,543,564, which is a continuation of application No. 10/745,966, filed on Dec. 23, 2003, now abandoned.

(60) Provisional application No. 60/436,191, filed on Dec. 23, 2002.

(51) Int. Cl.
*G06F 16/245* (2019.01)
*G06F 16/951* (2019.01)
*G06F 16/2457* (2019.01)

(58) Field of Classification Search
USPC .......................................................... 707/754
See application file for complete search history.

(56) References Cited

U.S. PATENT DOCUMENTS

| | | | |
|---|---|---|---|
| 5,694,593 | A | 12/1997 | Baclawski |
| 5,768,578 | A | 6/1998 | Kirk et al. |
| 5,794,232 | A | 8/1998 | Mahlum et al. |
| 5,845,278 | A | 12/1998 | Kirsch et al. |
| 5,920,856 | A | 7/1999 | Syeda-Mahmood |
| 6,006,217 | A | 12/1999 | Lumsden |
| 6,009,442 | A | 12/1999 | Chen et al. |
| 6,018,733 | A | 1/2000 | Kirsch et al. |
| 6,073,170 | A | 6/2000 | Sumita et al. |
| 6,195,654 | B1 | 2/2001 | Wachtel |
| 6,202,023 | B1 | 3/2001 | Hancock et al. |
| 6,308,168 | B1 | 10/2001 | Dovich et al. |
| 6,345,273 | B1 | 2/2002 | Cochran |
| 6,490,579 | B1 | 12/2002 | Gao et al. |
| 6,578,022 | B1 | 6/2003 | Foulger et al. |
| 6,609,122 | B1 | 8/2003 | Ensor |
| 6,721,736 | B1 | 4/2004 | Krug et al. |
| 6,745,182 | B2 | 6/2004 | Josenhans |
| 6,751,612 | B1 | 6/2004 | Schuetze et al. |
| 6,807,539 | B2 | 10/2004 | Miller et al. |
| 6,826,559 | B1 | 11/2004 | Ponte |
| 7,003,517 | B1 | 2/2006 | Seibel et al. |
| 7,085,766 | B2 | 8/2006 | Keith, Jr. |
| 7,155,430 | B2 | 12/2006 | Sihvo et al. |
| 7,249,122 | B1 | 7/2007 | Bushee et al. |
| 7,257,588 | B2 | 8/2007 | Keith, Jr. |
| 7,305,401 | B2 | 12/2007 | Keith, Jr. |
| 2002/0032672 | A1 | 3/2002 | Keith |
| 2002/0169764 | A1 | 11/2002 | Kincaid et al. |
| 2003/0037050 | A1* | 2/2003 | Monteverde .......... G06F 16/951 |
| 2003/0126136 | A1 | 7/2003 | Omoigui |
| 2003/0212673 | A1 | 11/2003 | Kadayam et al. |
| 2004/0088313 | A1 | 5/2004 | Torres |
| 2005/0010605 | A1 | 1/2005 | Conrad et al. |
| 2005/0034064 | A1 | 2/2005 | Meyers et al. |
| 2005/0179552 | A1 | 8/2005 | Shoji et al. |
| 2006/0004731 | A1 | 1/2006 | Seibel et al. |
| 2006/0048053 | A1 | 3/2006 | Sembower et al. |
| 2006/0161535 | A1 | 7/2006 | Holbrook |

OTHER PUBLICATIONS

Conrad, J. G., et al., "Database Selection Using Actual Physical and Acquired Logical Collection Resources in a Massive Domain-Specific Operational Environment", Proceedings of the 28th International Conference on Very Large Data Bases (VLDB), (2002), 12 pgs.

Conrad, J. G., et al., "Early User-System Interaction for Database Selection in Massive Domain-Specific Online Environments", ACM Transactions on Information Systems, 21 (2), (Apr. 2003) 1-35.

Conrad, J. G., et al., "Effective Collection Metasearch in a Hierarchical Environment: Global vs. Localized Retrieval Performance", Proceedings of the 25th Annual International ACM SIGIR Conference on Research and Development in Information Retrieval (SIGIR '02), (2002), 371-372.

Conrad, J. G., et al., "Global vs. Localized Search: A Comparison of Database Selection Methods in a Hierarchical Environment", Proceedings of the American Society for Information Science and Technology (ASIST 2002). 39(1). (2002), 130-139.

Conrad, J. G., "Online Duplicate Document Detection: Signature Reliability in a Dynamic Retrieval Environment", Proceedings of the 12th International Conference on Information and Knowledge Management (ICIKM '03), (Nov. 2003), 443-452.

* cited by examiner

INFORMATION RETRIEVAL SYSTEMS WITH DATABASE-SELECTION AIDS

CROSS-REFERENCE TO RELATED APPLICATIONS

The present application is a continuation of U.S. patent application Ser. No. 14/034,077 filed Sep. 23, 2013 and entitled "INFORMATION RETRIEVAL SYSTEMS WITH DATABASE-SELECTION AIDS," which is a division of U.S. patent application Ser. No. 10/916,116 filed Aug. 11, 2004 and entitled "INFORMATION RETRIEVAL SYSTEMS WITH DATABASE-SELECTION AIDS," issued Sep. 24, 2013 as U.S. Pat. No. 8,543,564, which is a continuation of U.S. patent application Ser. No. 10/745,966 filed Dec. 23, 2003 and entitled "INFORMATION RETRIEVAL SYSTEMS WITH DATABASE-SELECTION AIDS," which claims priority to U.S. Provisional Patent Application No. 60/436,191 filed Dec. 23, 2002 and entitled "SYSTEMS, METHODS, AND SOFTWARE FOR DATABASE SELECTION AND SEARCHING." Each of these applications is incorporated by reference herein in their entirety.

COPYRIGHT NOTICE AND PERMISSION

A portion of this patent document contains material subject to copyright protection. The copyright owner has no objection to the facsimile reproduction by anyone of the patent document or the patent disclosure, as it appears in the Patent and Trademark Office patent files or records, but otherwise reserves all copyrights whatsoever. The following notice applies to this document: Copyright © 2002, Thomson Legal and Regulatory, Inc.

TECHNICAL FIELD

The present invention concerns information retrieval systems, such as those that include collections of databases and provide legal documents or other related content.

BACKGROUND OF THE INVENTION

The American legal system relies heavily on both written laws and judicial opinions that apply these laws to particular legal disputes. Because legislatures change laws and new judicial opinions affect how laws are interpreted and applied, judges and lawyers within our legal system must continually research these laws and opinions to effectively advise their clients.

To facilitate this research, Thomson Legal & Regulatory, Inc. of St. Paul, Minn. offers a system of databases and research tools, known as Westlaw®, which provides online access to judicial opinions, statutes, administrative regulations, legal articles, and news from all over the world. The Westlaw system empowers users to search over 100 million documents organized in over 15,000 databases.

One problem recognized by the present inventors is that the vast number of databases in the Westlaw system can be difficult for some users to access effectively. For example, users unfamiliar with the array of database options may run "good" searches against a "bad" set of databases or against an overly broad set of databases. Selection of a bad set of databases will yield very few, if any, relevant documents. And, those documents that are found are likely to be of little value to the user, potentially leading him to incorrectly conclude that the system lacks what he needs. Likewise, selection of an overly broad set of databases can also lead to poor outcomes, since the search results will likely leave the user the task of sifting through a multitude of lesser relevant documents to find the few highly desirable ones. Overly broad searches, moreover, can be computationally and financially expensive to systems, such as Westlaw, that have finite computing resources to serve the thousands of researchers they attract daily.

To address this problem, the Westlaw system includes two separate features: a find-a-database assistant (or wizard), and a hierarchical, online directory (or outline) of its 15,000-plus databases. The find-a-database wizard, which replaced a searchable listing of crude database profiles known as IDEN (short for identify), allows users to run a query against a set of database profiles and then to identify one or more of the found databases for use in a subsequent search. The separate online directory helps users find specific databases by presenting database titles and descriptions as an interlinked hierarchy of categories, subcategories, sub-subcategories, and so forth. The user can browse or navigate through the hierarchy by pointing to and clicking on specific categories and subcategories to reveal underlying subcategories and any associated database listings. The user can in turn review these listings and identify one or more databases for a subsequent search.

Unfortunately, neither the wizard nor the directory has proven as effective as desired in helping users target the right databases. The wizard uses conventional natural language search technology, and often lists many more databases than are necessary to meet the actual needs of its users. The size and complexity of the directory make it cumbersome and time-consuming to browse. Furthermore, because systems, such as Westlaw, are expanding daily with the addition of new databases, the efficacies of the current wizard and directory are diminishing as the problem of targeting the right databases is worsening.

Accordingly, the present inventors have recognized a need to improve how users search for documents in legal-research systems, such as Westlaw, as well as other information retrieval systems that employ large collections of databases.

BRIEF SUMMARY OF THE INVENTION

To address this need, the present inventors devised systems, methods, and software that present users with multiple options for effectively and efficiently targeting their searches on an appropriate set of databases. One exemplary system presents online users with multiple forms of user-selectable search assistance. A first form, referred to as database discovery, provides a set of database profiles based on data-sampling techniques, and enables users to run searches against these profiles to identify relevant databases. A second form, referred to as database navigation, is a hierarchical database directory that allows users to navigate to any desired category or subcategory and search all the databases or database profiles underneath the category. A third form, referred to as database selection, allows a user to categorize a query and presents, based on the category, a set of database choices, a set of links to specific portions of a database directory, or a set of decisions to further delineate needs.

One or more of these and/or other forms of search assistance presented by the inventors ultimately enable users to develop and execute more effective search strategies, while potentially reducing computational burdens on online search systems, and most importantly increasing user satisfaction.

DETAILED DESCRIPTION OF EXEMPLARY EMBODIMENTS

This description, which references and incorporates the above-identified Figures, describes one or more specific embodiments of an invention. These embodiments, offered not to limit but only to exemplify and teach the invention, are shown and described in sufficient detail to enable those skilled in the art to implement or practice the invention. Thus, where appropriate to avoid obscuring the invention, the description may omit certain information known to those of skill in the art.

Exemplary Definitions

The description includes many terms with meanings derived from their usage in the art or from their use within the context of the description. However, as a further aid, the following exemplary definitions are presented.

The term "document" refers to any addressable arrangement of machine-readable data, such as textual data.

The term "database" includes any physical or logical arrangement of documents. In some embodiments, one or more of the databases share content with one or more other databases. Thus, the databases are not necessarily mutually exclusive. Indeed, some databases may be entirely contained by other databases.

Exemplary Information Retrieval System

Figure 1:
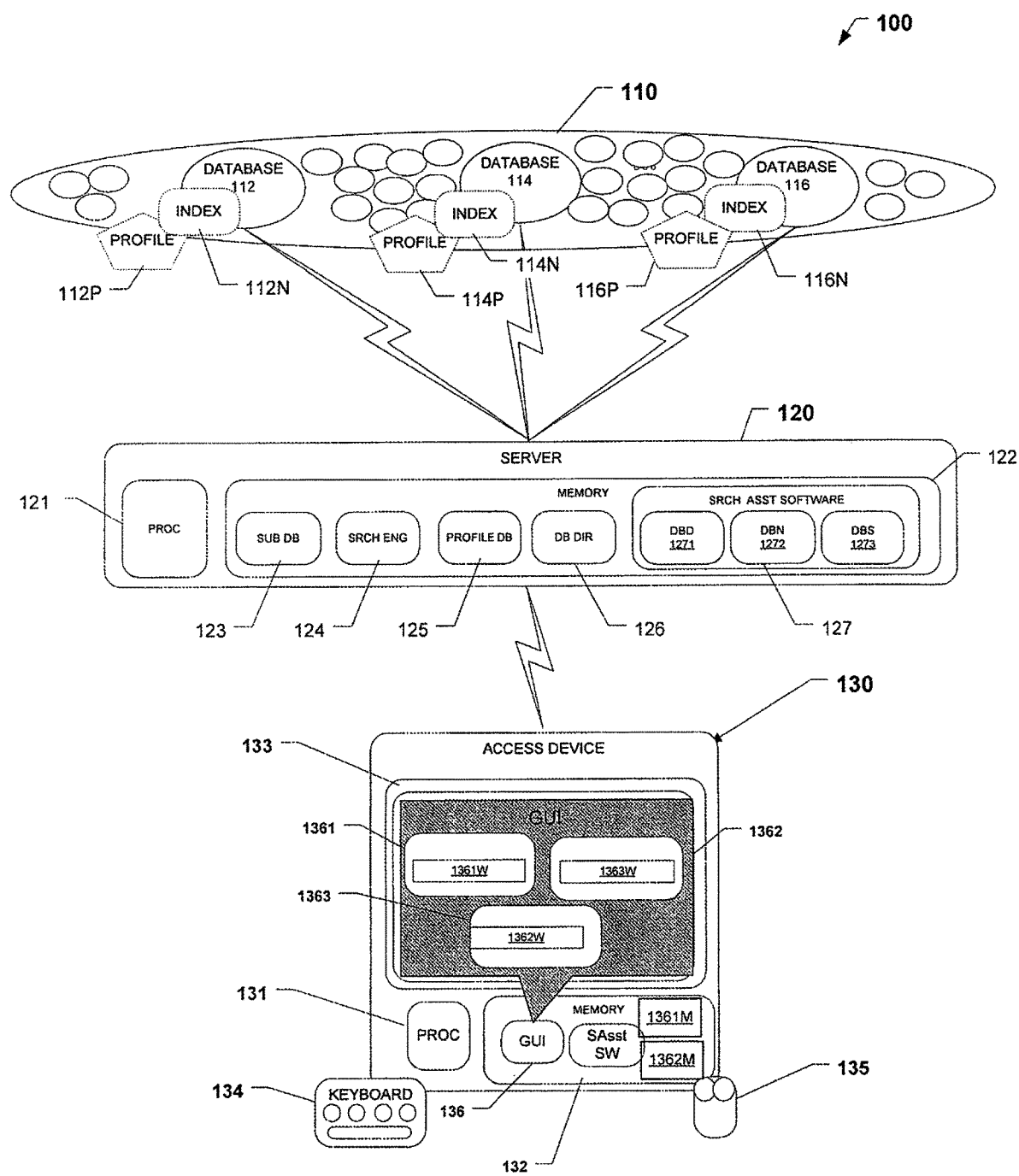
FIG. 1 is a diagram of an exemplary information retrieval system 100 corresponding to one or more embodiments of the invention.

FIG. 1 shows an exemplary online information retrieval system 100. System 100 includes one or more databases 110, one or more servers 120, and one or more access devices 130.

Databases 110 include representative databases 112, 114, and 116. In the exemplary embodiment, databases 110 include over 15,000 legal, business, and news databases, such as those within the Westlaw™ online research system which is available from Thomson Legal and Regulatory, Inc. of St. Paul, Minn. However, in other embodiments, one or more of the databases include financial, scientific, or healthcare data.

Databases 112, 114, and 116, which take the exemplary form of one or more electronic, magnetic, or optical data-storage devices, include or are otherwise associated with respective indices 112N, 114N, and 116N and respective database profiles 112P, 114P, and 116P. Each of the indices includes terms and phrases in association with corresponding document addresses, identifiers, and other conventional information. In some embodiments, each of the indices may also include consonant clusters (as described below) and Porter-type word stems. (For background information on Porter-type stems, see for example, M. F. Porter, "An Algorithm for Suffix Stripping," in Program, 14(3), pp. 130-137, 1980.)

Figure 2:
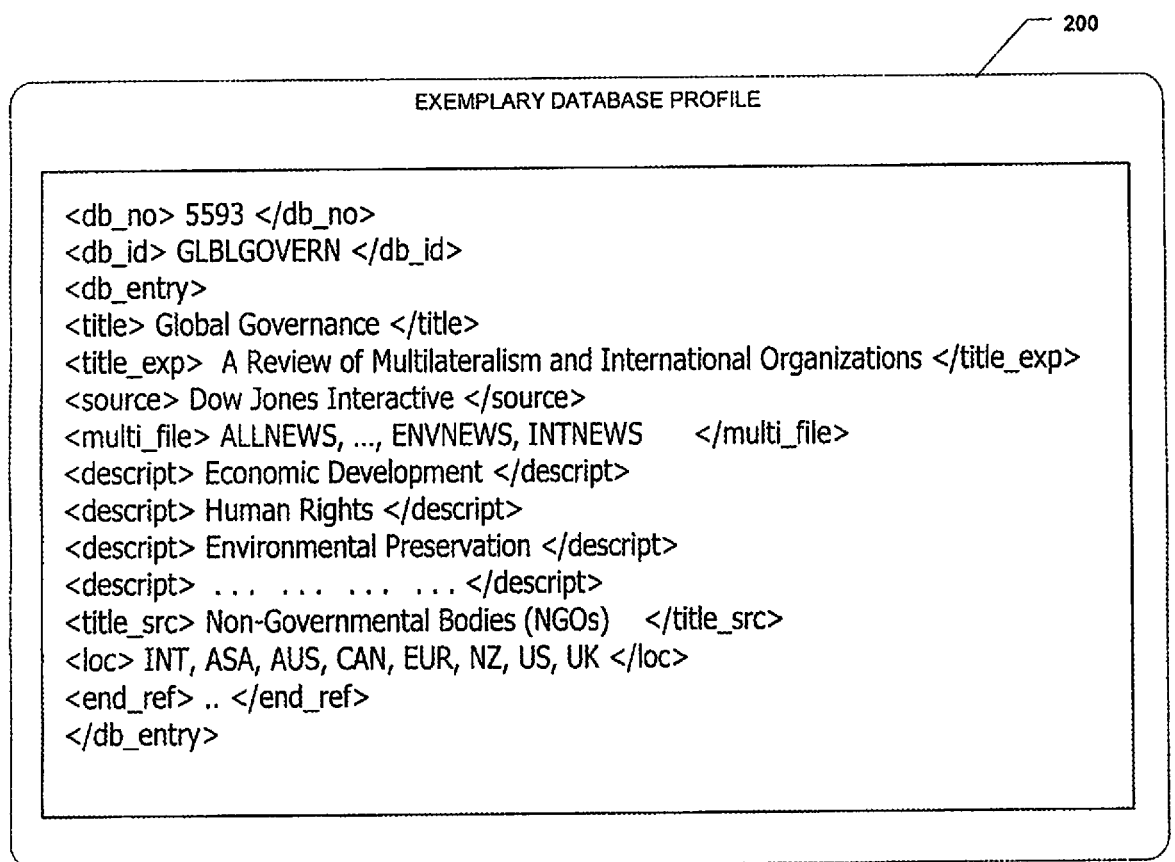
FIG. 2 is a facsimile of an exemplary database profile 200 used in system 100.

In the exemplary embodiment, two types of database profiles (or authority files) 112P-116P are included: one based on metadata, such as the titles and other data about the content of its corresponding database or corresponding set of databases, and the other based on actual database contents, such as query-based data samples and/or language models. FIG. 2 shows a facsimile of an exemplary metadata-based database profile 200 defined using a markup language, such as XML (extensible markup language.) More particularly, some of the metadata-based profiles are organized around categories, such as "courts and government agencies," "legal practice and research," "geographic region or location." Similarly, some of the sample-based profiles are arranged in collections to support category-specific searches. Exemplary categories include document type (case law, statutes, analytical, news, international, and so forth); practice areas (bankruptcy, communications, criminal law, and so forth); and geographic region (United Kingdom, Arizona, New York City, and so forth).

Databases 112, 114, and 116 are coupled or couplable via a wireless or wireline communications network, such as a local-, wide-, private-, or virtual-private network, to server 120.

Server 120, which is generally representative of one or more servers for serving data in the form of webpages or other markup language forms with associated applets, ActiveX controls, or other related software and data structures to service clients of various "thicknesses." More particularly, server 120 includes a processor 121, a memory 122, a subscriber database 123, one or more search engines 124, a profile database 125, a database directory 126, and a search-assistant software module 127 (one or more cross-platform interface objects or modules).

Processor 121, which is generally representative of one or more local or distributed processors or virtual machines, is coupled to memory 122. Memory 122, which takes the exemplary form of one or more electronic, magnetic, or optical data-storage devices, stores subscription database 123, search engines 124, profile database 125, database directory 126, and search-assistance software 127.

Figure 3:
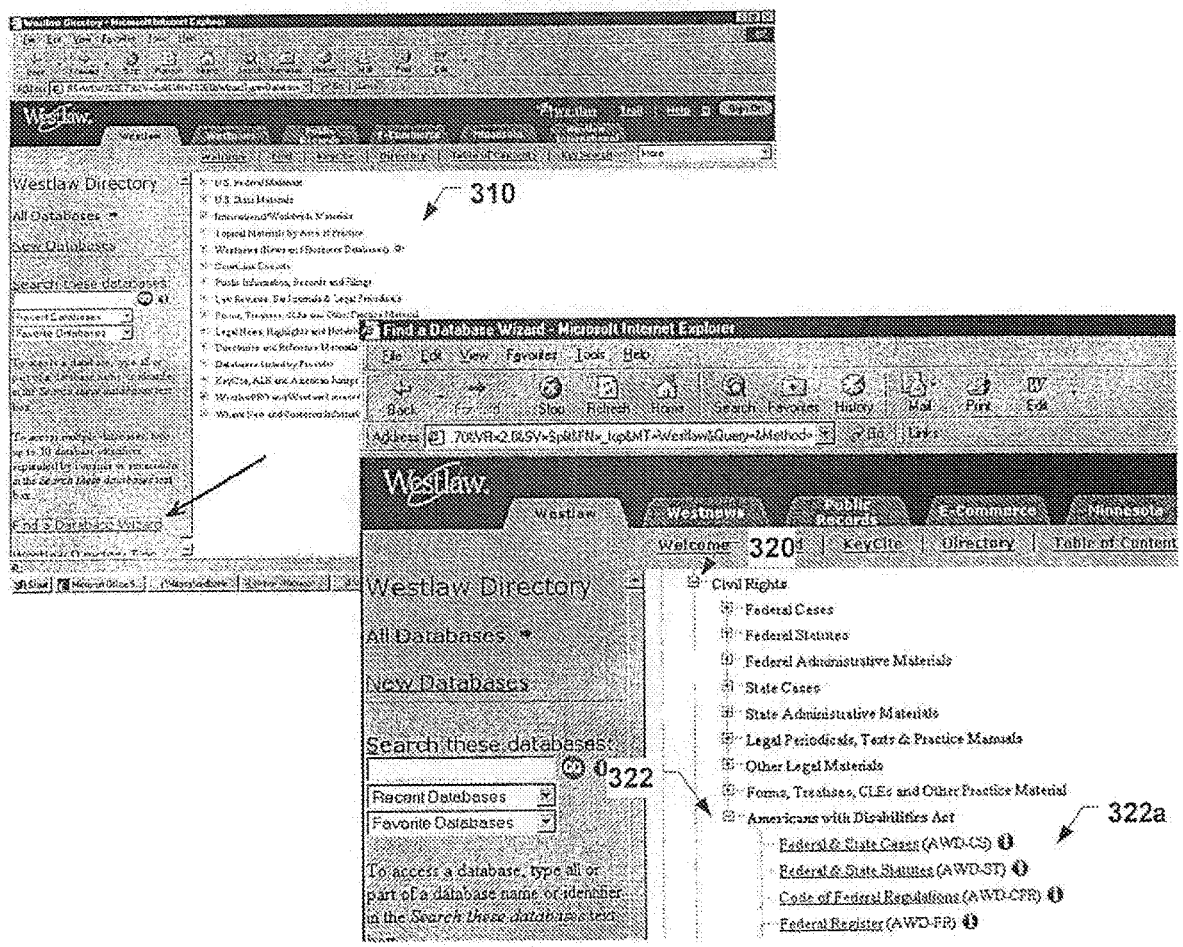
FIG. 3 is a block diagram of an exemplary database directory used in system 100.

Subscription database 123 includes subscriber-related data for controlling, administering, and managing pay-as-you-go- or subscription-based access of databases 110. Search engines 124 provide Boolean or natural language search capabilities for databases 110, as well as for profile database 125 and database directory 126. (Search engine functionality is further described below.) Profile database 125 contains profiles from databases 110, such as profiles 112P, 114P, and 116P. Database directory 126 includes a hierarchically organized listing of the databases 110 and an associated index 126N, which in the exemplary embodiment includes not only terms, stemmed terms, and phrases or concepts, but also consonant clusters (which are described in more detail below). FIG. 3 shows an exemplary database directory structure 300 used in some embodiments.

Search-assistance software 127—which, among other things, defines one or portions of a graphical user interface that helps users define searches for databases 110—includes one or more browser-compatible applets, webpage templates, user-interface elements, objects or control features or other programmatic objects or structures. More specifically, software 127 includes a database-discovery module 1271, a database-navigation module 1272, and a database-selection module 1273. Each module, in the exemplary embodiment, includes a set of one or more browser-compatible user-interface elements and associated software structures for assisting users in targeting relevant databases from databases 110.

Server 120 is communicatively coupled or couplable via a wireless or wireline communications network, such as a local-, wide-, private-, or virtual-private network, to one or more access devices, such as access device 130.

Access device 130 is not only communicatively coupled or couplable to server 130, but also generally representative of one or more access devices. In the exemplary embodiment, access device 130 takes the form of a personal computer, workstation, personal digital assistant, mobile telephone, or any other device capable of providing an effective user interface with a server or database.

Specifically, access device 130 includes one or more processors (or processing circuits) 131, a memory 132, a display 133, a keyboard 134, and a graphical pointer or selector 135. Memory 132 includes a graphical user interface (GUI)136 which upon execution causes display of data in association with one or more interactive control features (or user-interface elements) on display 133. (The exemplary embodiment defines one or more portions of graphical user interface 136 using applets or other programmatic objects or structures from server 120; one or more of these applets or structures can be processed and executed using a browser.)

More specifically, graphical user interface 136 defines or provides one or more display regions, such as representative regions 1361, 1362, 1363. Display regions 1361, 1362, and 1363 are respectively defined in memory to display data from databases 110 and/or server 120 in combination with interactive control features (elements or widgets) 1361W, 1362W, and 1363W. In the exemplary embodiment, each of these control features takes the form of a hyperlink or other browser-compatible command input, and provides access to a search-assistance option for identifying one or more relevant target databases among databases 110 and ultimately accessing or retrieving one or more documents via server 120.

Exemplary Database-Discovery Module

Interactive control feature 1361W is selectable to invoke operation of database-discovery module (program or objects) 1361M within access device 130 (or module 1271 within server 120.) This module assists users in determining which of databases 110 to access by accepting a query from the user and running that query against a set of sample-based database profiles in profile database 125 for each of the databases in the system, that is, databases 110. Each profile is defined by treating its corresponding database as a document and representing its actual terms or phrases and their corresponding frequencies.

Figure 4:
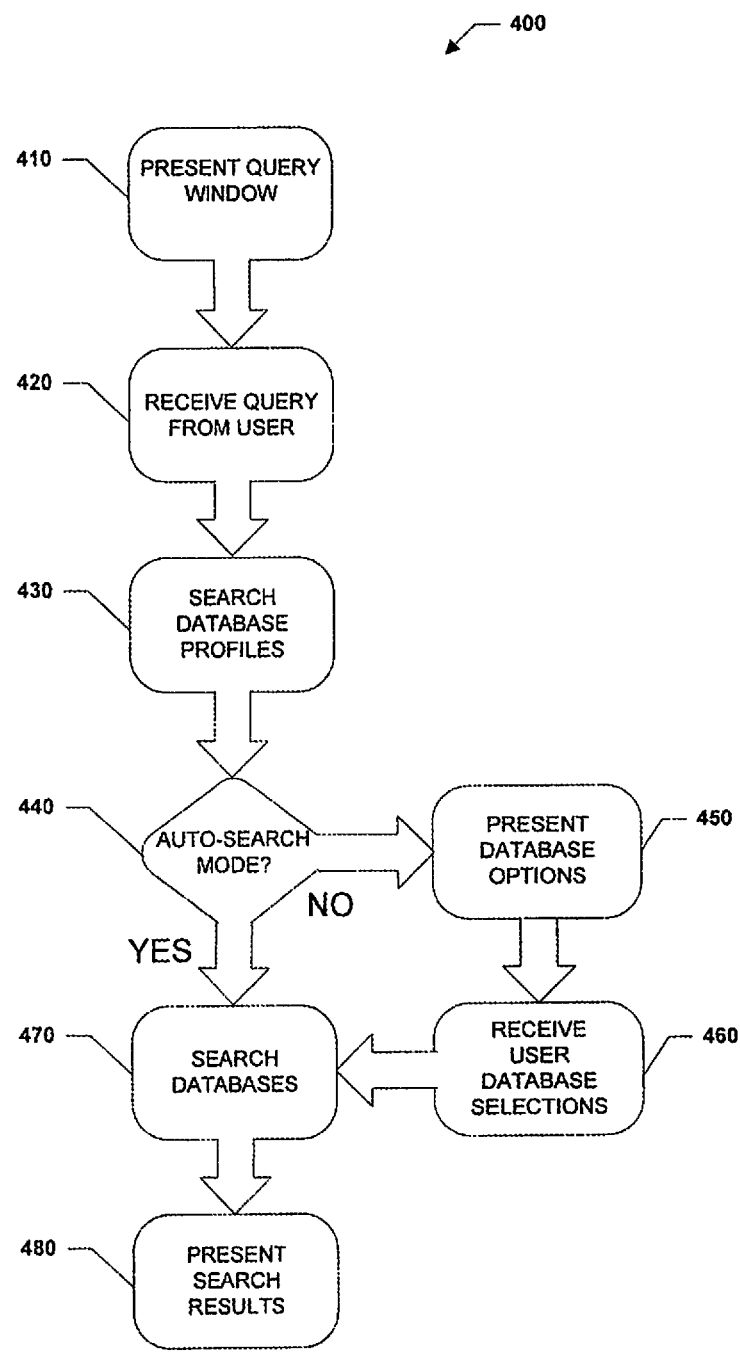
FIG. 4 is a flowchart corresponding to one or more exemplary methods of operating a database-discovery module within system 100.

More precisely, FIG. 4 shows a flow chart 400 of an exemplary method of executing database-discovery module 1361M. Flow chart 400 includes process blocks 410-470.

At block 410, the exemplary method begins with presentation or rendering of a query dialog window portion of graphical user interface 136 on display 133. Execution continues at block 420.

In block 420, a query is received from the user. In the exemplary embodiment, this entails the user entering a string of natural language text in the query window. However, in other embodiments, the user may use Boolean and other forms of query commands and connectors. Execution proceeds to block 430.

Block 430 identifies and ranks by probable relevance a set of relevant databases by searching a set of database profiles based on the received query. In the exemplary embodiment, this identification entails searching profile database 125 using one or more portions of the received query and search engines 124, specifically a natural language search engine or language-model-based approach with one or more techniques for scoring and ranking the relevance of the database profiles and corresponding databases (for example, profiles 112P, 114P, and 116, and databases 112, 114, and 116 in FIG. 1) to the submitted query. (Exemplary scoring is described below in the Exemplary Relevance Scoring and Ranking section.) Execution continues at block 440.

Block 440 determines whether to automatically execute the received query against one or more of the identified databases. In the exemplary embodiment, this entails checking a user-preference indicator associated with the user in session data received from the user upon initiation of the current search session or retrieving user-preference data from subscription database 123 within server 120 (in FIG. 1.) If the determination is to perform an automatic search, execution advances to block 470, which performs a full search of one or more of the identified databases, for example all of them or the top N-ranked among them.

Some embodiments automatically execute the query against a fixed or dynamically chosen number N of the ranked databases. For example, one embodiment uses the top N-ranked databases, where N is a fixed value independent of the actual set of databases. Another determines N dynamically based on a percentage of the number of databases in the selection set. Yet another accepts the highest ranked database and every next highest database that is within some differential belief value of the previously accepted database. In other words, this embodiment truncates the results list based on gap thresholding. Other embodiments may vary N based on a minimum threshold score. The search results are then presented to the user via access device 130 as indicated in block 480.

If block 440 determines not to conduct an automatic search of the identified databases, execution branches to block 450.

Block 450 entails presenting the user with a ranked list of the identified databases for further user input. In the exemplary embodiment, this entails presenting a dialog box that lists two or more of the identified databases in rank order along with corresponding titles, identifiers, and/or other descriptive material. Each of the ranked databases is associated with a corresponding interactive control feature, such as a radio button or check box, to enable the user indicate selection or alternatively deselection of individual databases for further use. (Some embodiments include a select-all-type check box to allow the user to efficiently check all the radio buttons or check box. To aid user selection, some variants of this embodiment may list the relevance or "belief" score for each of the ranked databases.) The dialog box also includes an interactive control feature, such as a submit or next button, which the user can click to advance execution to block 460.

Block 460 entails receiving user database selections. In the exemplary embodiment, the user database selections made at block 450 are communicated from access device 130 and received at server 120. Then, as block 470 shows, a search of the selected databases is made, and the results are presented at block 480.

Exemplary Relevance Scoring & Ranking for Block 430

Block 430, as described above, entails identifying a ranked set of databases based on the user-submitted query. To this end, the exemplary embodiment computes a probable relevance or belief score of term $w_i$ in database profile $d_j$ for each database using:

$$P\text{belief}(w_i|d_j) = d_b + (1-d_b) \cdot tf_b \cdot idf_b, \quad (1)$$

where $d_b$ denotes the minimum belief component; $tf_b$ denotes the term frequency within the database profile and $idf_b$ denotes the inverse document frequency of term $w_i$ across the collection of database profiles and thus indicates the rareness of a term within the collection. $tf_b$ is more specifically defined as $$tf_b = d_t + (1-d_t) \cdot \frac{\log(tf_{ij} + 0.5)}{\log(tf_{max j} + 1.0)} \quad (2)$$

where $d_t$ is the minimum term frequency component when term $w_i$ is present in a database profile, $d_j$; $tf_{i,j}$ denotes the frequency of a specific term $w_i$ within a database profile, $d_j$, and thus provides some indication or measure of the importance of the term within the profile; and $(tf_{max\ j}$ denotes the frequency of the most frequently occurring term in the database profile, $d_j$. And, $idf_b$, is defined as $$idf_b = \frac{\log\left(\frac{N+0.5}{n}\right)}{\log(N+1.0)} \quad (3)$$

where n denotes the number of database profiles containing the query term $w_i$; N denotes the total number of database profile documents; In various embodiments, N varies depending on whether one is calculating idf based on the global or local profile set.

For additional information regarding natural language searching, see U.S. Pat. No. 5,488,725 entitled System of Document Representation Retrieval By Successive Iterated Probability Sampling; U.S. Pat. No. 5,418,948 entitled Concept Matching of Natural Language Queries with a Database of Document Concepts; and U.S. Pat. No. 5,265,065 entitled Method and Apparatus for Information Retrieval from a Database by Replacing Domain Specific Stemmed Phases in a Natural Language Search to Create a Search Query. These patents are incorporated herein by reference.

Other embodiments use a language model, such as one based on an additive or weighted sum approach, such as $$p_{sum}(w_i|d) = \lambda \cdot p_{profile}(w_i|d) + (1-\lambda) \cdot p_{profile\ db}(w_i) \quad (4)$$

where λ is a weighting factor between 0 and 1. If there are sparse-data problems when $P_{profile}(w_i|d)$ is 0 (that is, an unobserved event), some embodiments extend the original document model with a database model, such as in Eq. (4). An additive model can help by leveraging extra evidence from the complete collection of profiles.

Additionally, treating the query as a sequence of terms, with each term viewed as an independent event and with the query representing the joint event, yields the relevance or belief score $$p_{sequence}(Q|d) = \prod_{i=1}^{M} p(w_i|d) \quad (5)$$

where $w_1, w_2 \ldots w_M$ is a sequence of terms in the query Q and where d denotes the database profile. This treatment not only facilitates handling of duplicate query terms, but also permits construction of a model with phrases in local contexts. Some embodiments may also incorporate smoothing to address terms that may not be present in the current model.

After computing the relevance scores and as part of the identification of relevant databases, one embodiment re-ranks the databases based on jurisdictional lexical analysis. The re-ranking entails determining whether the query contains any jurisdictionally relevant content, and if it does not, any of the search results that identify jurisdictionally biased collections are down-weighted relative to other found databases that lack the jurisdictional restriction. The rationale for this down-weighting is that legal topics often appear in collections organized around jurisdictions, such as a state jurisdiction. Some embodiments apply the re-ranking technique to each query, but leave the databases that match the jurisdictional lexical clues in their original rank(s), while downweighting those that do not.

For additional information on the database-discovery module and potential variants, see the section of the incorporated applications 60/436,191; Ser. Nos. 10/745,966; or 10/754,083, which is entitled Database Selection Using Actual Physical and Acquired Logical Collection Resources in a Massive Domain-specific Operational Environment.

Exemplary Database-Navigation Module

In addition to FIG. 1's interactive control feature 1361W, which invokes execution of database-discovery module 1361M as illustrated in FIG. 3, graphical user interface 136 provides interactive control feature 1362W. This feature is selectable to invoke execution of a database-navigation module (program or objects) 1362M that assists users in browsing and searching using a hierarchical database directory (or tree structure), such as database directory 126 or 300. In other words, this module allows a user to drill down into the directory, level by level, pausing at any level, entering a query, and running a restricted natural language search against the databases associated with all subdirectories located beneath the current mid-level node.

Figure 5:
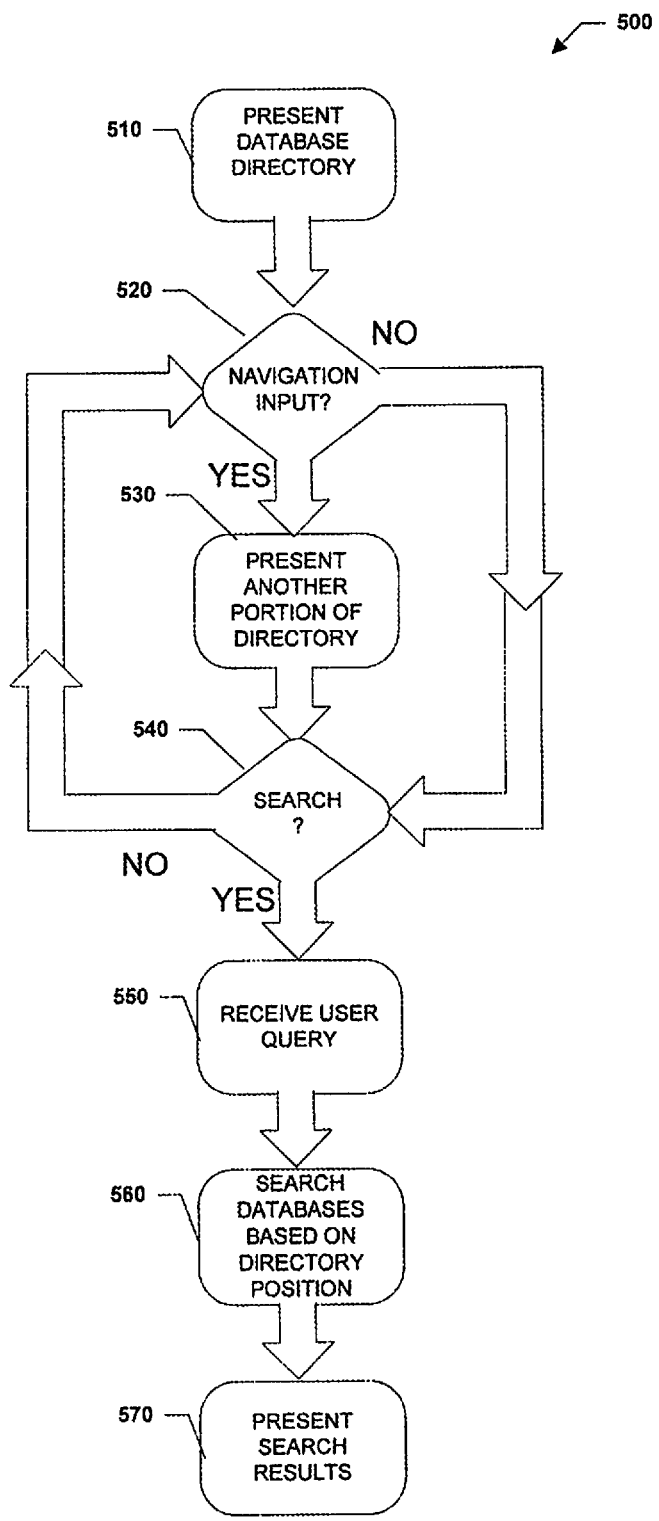
FIG. 5 is a flowchart corresponding to one or more exemplary methods of operating a database-navigation module within system 100.

More specifically, FIG. 5 shows a flow chart 500 of an exemplary method of executing database-navigation module 1362M. Flow chart 500 includes process blocks 510-570.

Block 510 entails presenting or displaying at least a portion of database directory on display 133. In the exemplary embodiment, this entails initially displaying a window showing the root and main categorical nodes of the database directory, with each node associated with an interactive control feature, such as a navigation hyperlink or icon, which indicates whether each currently shown category includes subordinate categories (or leaf nodes) and which is selectable using a mouse or other graphical pointer to reveal subordinate categories and/or database identifiers. Also, some embodiments associate one or more directory listings with interactive control features that allow for users to view a detailed written description of the contents of the corresponding category of databases or of corresponding individual databases. Execution then advances to block 520.

Block 520 entails determining whether there has been a selection made to display one or more other portions of the directory. In the exemplary embodiment, this entails determining whether the interactive control feature for one of the currently displayed categories has been selected. If a control feature has been selected, execution advances to block 530.

Block 530 presents another portion of the database directory. In the exemplary embodiment, this entails display of one or more portions of the directory associated with the interactive control feature selected or activated at block 520. These portions may include portions associated with subordinate, superior, or equal-rank categories. It may also include a listing of databases underneath the selected or activated node, for example, if the user has navigated to a leaf or terminal node.

Block 540, which immediately follows execution of block 530 or a negative determination at block 520, entails determining whether the user has requested a search of databases associated with the currently displayed portion of the directory. If the determination is that no search is desired, for example, because the no interactive control feature associated with a search command has been selected, then execution returns to block 520 to determine whether additional navigational input has been received. However, if the determination is that a search is desired, for example, through interaction with an appropriate control feature, execution continues at block 550.

Block 550 entails receiving a query. In the exemplary embodiment, this entails the user entering a text query in a dialog box and selecting a submission button.

Block 560, which is executed in response to receipt of a query, runs the query against one or more databases or database profiles associated with the currently selected or displayed portion of the directory. The exemplary embodiment runs the query using search engines 124 (shown in FIG. 1.) Execution then continues at block 570, which presents results (databases or documents) of the search to the user via access device 130. If the presented search results include databases (more precisely database identifiers), the user selects one or more of the databases and initiates a search for documents.

For additional information on the exemplary database-navigation module and potential variants, see the sections of the incorporated applications 60/436,191; Ser. Nos. 10/745,966; or 10/754,083, which are entitled Effective Collection Metasearch in a Hierarchical Environment, Global vs. Localized Search: A Comparison of Database Selection Methods in a Hierarchical Environment, and The New Westlaw Directory: White Paper on Browse + Search Features.

Exemplary Database-Selection Module

Interactive control feature 1363W is selectable to invoke execution of a database-selection module (program or objects) 1363M that assists users in identifying relevant databases based on query categorization. Some of the categories of queries are addressed with a natural language search engine that runs against several authority resources, whereas others are addressed using interactive decision trees.

Figure 6:
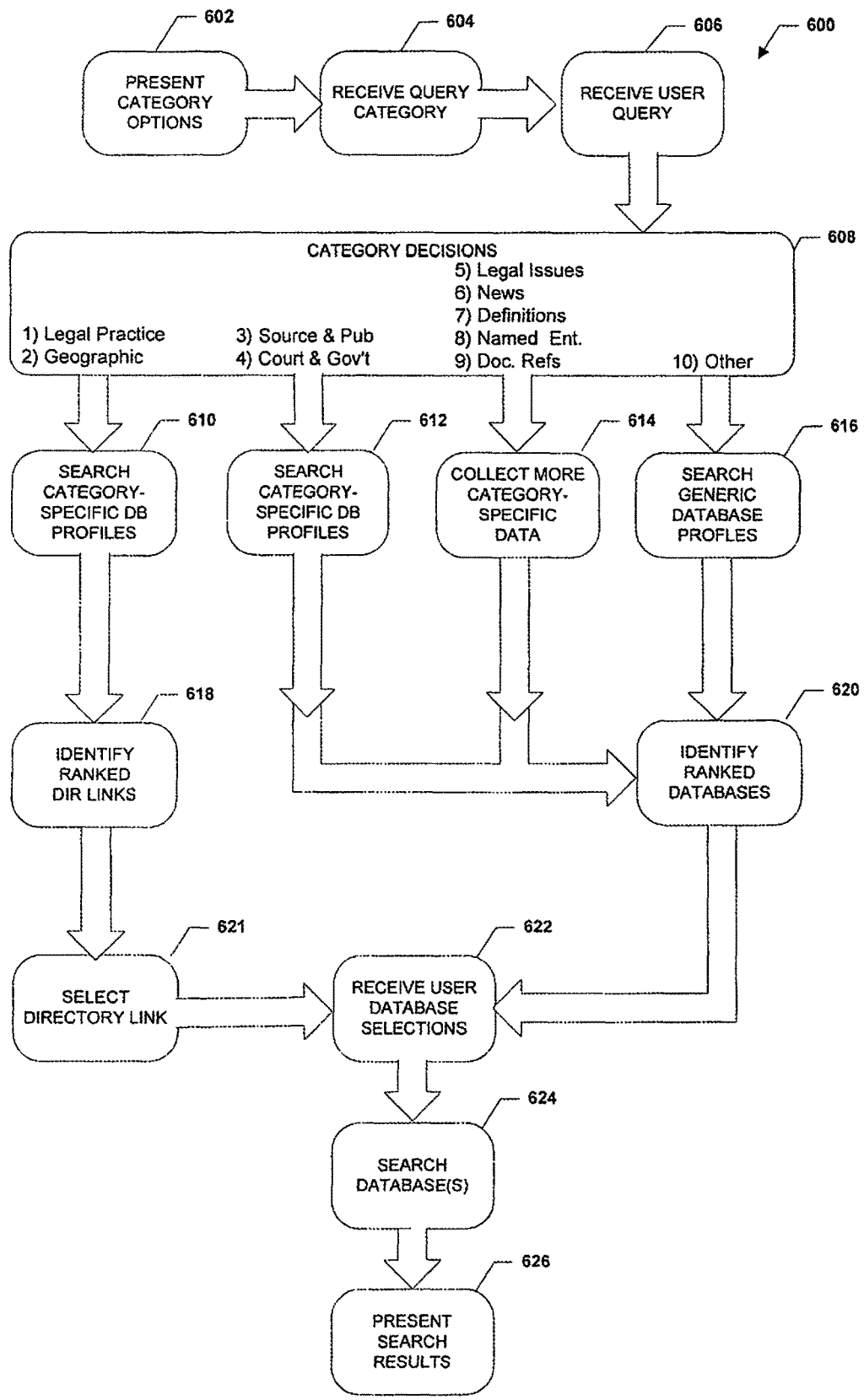
FIG. 6 is a flowchart corresponding to one or more exemplary methods of operating a database-selection module within system 100.

More particularly, FIG. 6 shows a flow chart 600 of an exemplary method of operating database-selection module 1363M. Flow chart 600 includes blocks 602-626.

In block 602, the exemplary method begins with display of a query-categorization window presenting a set of query-categorization options to the user. In the exemplary embodiment, this set of categories includes the following 10 categories:

| | |
|---|---|
| 1) Legal Practice & Research Areas | 2) Geographic Regions & Locations |
| 3) Sources & Publications | 4) Courts & Government Agencies |
| 5) Legal Issues | 6) News |
| 7) Definitions | 8) Named Entities |
| 9) Document References | 10) Other |

Other embodiments may use a subset of these categories, other categories altogether, or a subset of these categories plus one or more other categories. For example, another embodiment uses the ten listed categories plus financial, educational, scientific, or healthcare information.

Block 604 entails receiving at least one query-category selection. In the exemplary embodiment, this entails the user selecting the interactive control feature, such as a check box or radio button, associated with one of the listed query categories. To submit the query, the user clicks on an interactive control feature, such as a next or submit button, in the dialog window, which in turn causes module 1363M (or more precisely, graphical user interface 136 and access device 130) to communicate the query-category selection to server 120. Execution then continues at block 606.

In block 606, the system receives a query from the user. To this end, the exemplary embodiment prompts the user to enter a text query through use of a text dialog box. With submission of the query through user selection of a submit or next button on the dialog box, execution advances to block 608.

In block 608, the system determines, based on the received query category, how to assist the user in answering the query. In the exemplary embodiment, there are four possible ways to assist. If category 1 or 2 is selected, execution branches to block 610; if category 3 or 4 is selected, execution branches to block 612; if category 5, 6, 7, 8, or 9 is selected, execution branches to block 614; and if category 10, the "other" category, is selected, execution branches to block 616.

In block 610, which is executed with selection of the "Legal Practice & Research Areas" category or the "Geographic Regions & Locations" category, the system searches category-specific database profiles based on the received query. To this end, the exemplary embodiment uses a natural language search engine to search a category-specific variant or subset of profile database 125 (shown in FIG. 1) comprising metadata-based profiles. Each metadata-based profile in the profile database represents a set of one or more databases determined to be generally relevant to the selected category and thus facilitates identification of more highly relevant databases. However, other embodiments may search other forms of database representations. After the search, execution continues at block 618.

Block 618 entails presenting or displaying a ranked list of links to relevant portions (for example, categories or leaf nodes) of the database directory. The exemplary embodiment displays the ranked list in association with interactive control features, such as icons and hyperlinks, that are selectable to display or reveal the corresponding portions of the database directory. For example, if the user query were "California" and the selected category was "geographic," the exemplary system would present a link to a California portion of the online directory, which the user could use to access all links having databases determined to be relevant to California. However, if the selected query category were "legal practice" for the same "California" user query, the results would be a specific set of links related to legal practice in California. Execution then advances to block 621.

Block 621 entails the user selecting a link to cause display of a corresponding portion of the directory, such as shown in FIG. 3. Display of the selected portion of the directory provides the user information regarding the organization and content of databases underneath the selected link. In some embodiments, the revealed portion of the database directory can then be further navigated or searched by the user using the browse-search functionality of database-navigation module 1362W, as shown in FIG. 5. Execution then advances to block 622, with user selection of one or more databases.

Block 622 entails the system receiving user database selections. In the exemplary embodiment, this entails the user selecting and submitting one or more databases identified through use of the identified directory links. User database selections are communicated to server 120. Execution continues at block 624.

In block 624, the system uses the query submitted at block 606 to search databases corresponding to the database selections provided at block 622. In the exemplary embodiment, the search is conducted using a natural language search engine. Some embodiments provide a block prior to block 624, which enables the user to change or update the query submitted at block 606 and run the changed query against the selected database(s.) Execution then advances to block 626, which entails presenting search results to the user.

In addition to block 610, execution from block 608 can proceed, based on the selected query category, to block 612, 614, or 616.

In block 612, which is executed with selection of the "Sources & Publications" or the "Courts & Government Agencies" categories, the system searches category-specific database profiles based on the received query. In the exemplary embodiment, a natural language search engine is used to search a specially crafted profile database 125, with each database profile based on a language model for a subset of the databases predetermined to be relevant to the selected category. However, other embodiments may search other forms of database representations.

Block 614, which corresponds to selection of query categories "Legal Issues," "News," "Definitions," "Named Entities," or "Document References," entails collecting additional category-specific information from the user. In the exemplary embodiment, this entails presenting a category-specific decision tree as a series of dialog boxes, with each dialog box corresponding to a separate level or decision in the tree. For example, if the legal-issue category were selected at block 604, the exemplary system would prompt the user to first select one of the options: cases, statutes, law review; and if the cases option were selected, the system would prompt the user to select between state and federal options. Other embodiments may use other methods for gathering further information regarding a given category.

Figure 7:
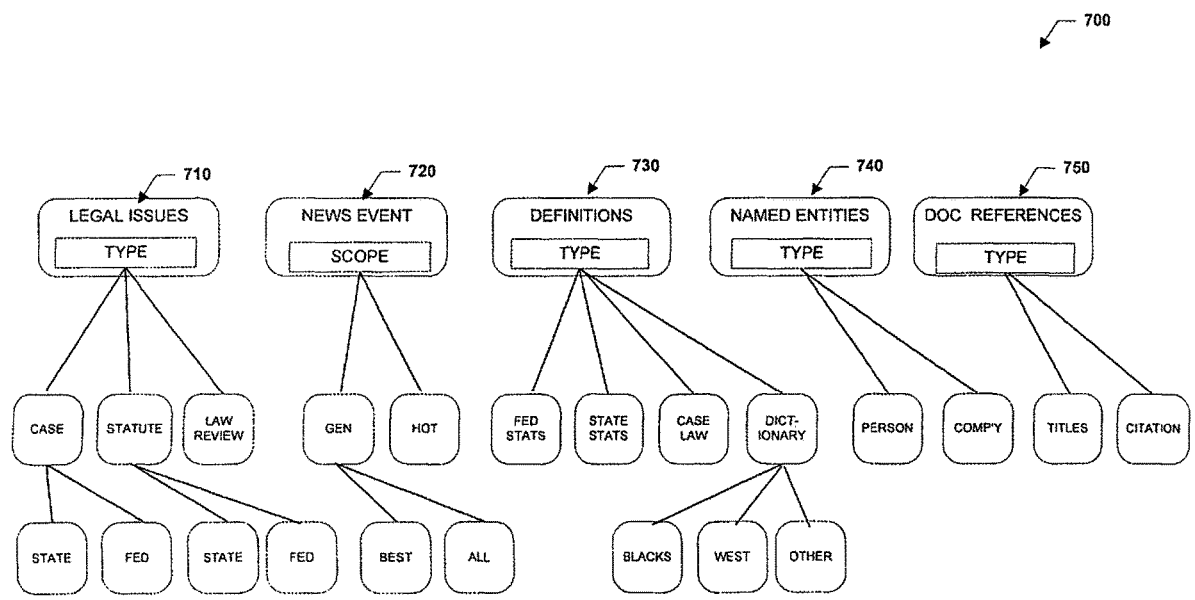
FIG. 7 is a flowchart corresponding to one or more additional exemplary methods of operating the database-selection module within system 100.

FIG. 7 shows a set of five category-specific decision trees used in the exemplary embodiment to gather additional category-specific data. Specifically, FIG. 7 shows a two-level legal tree 710, a two-tier news tree 720, a two-tier definitions tree 730, a single-tier named-entities tree 740, and a two-tier references tree 750.

Block 616, which is executed in response to selection of the "Other" category, entails searching a set of generic database profiles. In the exemplary embodiment, this set of database profiles represents the entire available collection of databases rather than a category-specific subset as used in blocks 610 and 612. Each profile, based on the actual data in the database, rather than metadata, is derived using data-sampling and/or language modeling techniques.

After execution of block 612, 614, or 616, execution continues at block 620. Block 620 identifies results of searching as a ranked list of databases. Execution then continues at block 622, which as already described, entails receiving user database selections and possibly modified user queries.

For more detailed information on the database-selection module and potential variants, see the section of the incorporated applications 60/436,191; Ser. Nos. 10/745,966; or 10/754,083, which is entitled Early User-System Interaction for Database Selection in Massive Domain-specific Online Environments.

Search Engine Enhancements

As noted above, server 120 (in FIG. 1) includes one or more search engines 124. In the exemplary embodiment, one or more of these search engines employ natural language techniques. Such techniques are described in detail in the previously referenced U.S. Pat. Nos. 5,488,725; 5,418,948; and 5,265,065. These search engines may also incorporate one or more of the following forms of enhancement.

Differential Treatment of Query Terms in Relevance Scoring

One or more search engines in the exemplary embodiment treat certain terms or classes of terms in queries differently from other query terms. These terms include geographic locations, legal practice areas, and certain common legal terms. For example, in relevance calculations, such as tf×df (term frequency times inverse document frequency) scores, the exemplary embodiment up-weights, by a factor of two, the relevance value of query terms related to geography and practice area as well as others deemed as having high discrimination or user-preference value. Examples of geographic terms include the "United Kingdom," "Arizona," and "New York City." Examples of practice-area terms that are up-weighted include "Civil Rights", "Intellectual Property", and "Workers Compensation."

Additionally, the exemplary embodiment down-weights, by a factor of two, the significance of generic terms, for example, generic legal terms, that are used frequently, but offer little value in discriminating one document from another similar document or one database from another. Examples of generic legal terms that are subject to down-weighting include law, regulation, code, department, cases, reporter, and journal.

Thus, rather than viewing every search term in a query as being of equal significance within relevance calculations, the exemplary system ultimately takes advantage of domain-specific knowledge to produce relevance scores that more accurately reflect the marginal relevance of terms with low or high discriminatory value within the domain.

Consonant Clustering of Query Terms

One or more search engines in the exemplary embodiment also selectively process queries, such as those related to category-specific databases, using a technique called consonant clustering. Specifically, to ensure that abbreviated, misspelled, or otherwise mistyped occurrences of terms in a query are given some role in query interpretation, the exemplary embodiment clusters consonants from the terms that do not match any terms in the applicable database indexes. In the exemplary embodiment, a clustered term is only matched against another clustered term, and not, for instance, against an indexed abbreviation that happens to correspond to a given cluster. The exemplary clustering process also uses an exception list since certain significant words share the same cluster. For example, 'supreme' and 'superior' have the same cluster.

Prior to clustering, the exemplary embodiment determines whether a given query term is five or more characters in length and whether it contains only letters. If both these conditions are satisfied, the exemplary embodiment defines a cluster for the query term as its first letter and the next two consonants. In the case where the next two consonants are double consonants, the exemplary embodiment takes the first of the double consonants and the next consonant following the double-consonant pair. The letter 'y' can be either a vowel or a consonant, depending on whether the preceding letter is a consonant or a vowel, respectively. However, if 'y' is a vowel at the end of a word and the cluster is not yet complete, the 'y' can serve to complete the cluster. The table below shows several examples of how the exemplary cluster algorithm facilitates matching of misspelled query terms with correctly spelled versions of those terms.

| Query Term | Equivalent Cluster | Matched Term |
| --- | --- | --- |
| colarado | clr | Colorado |
| missorri | msr | Missouri |
| loisiana | lsn | Louisiana |
| calif | clf | California |
| bankruptcy | bnk | bankruptcy |
| environmental | env | environmental |

Consonant clustering enables the exemplary embodiment to preserve the core or essence of a query term that may have been misspelled or poorly abbreviated or truncated. Thus, in one or more indices in the exemplary embodiment, each indexed term is associated or stored with its cluster representation. (Some terms, such as database identifiers and other special tokens, may not be represented with equivalent clusters.) Clustering is particularly useful for query terms representing states or other geographical regions, since such terms are generally of higher discriminatory value within a database and would generally contribute to higher precision results from a user perspective.

Top-Portion Scoring of Documents

One or more search engines in the exemplary embodiment also employ top- or best-portion scoring in quantifying the relevance of a document or database profile, rather than solely relying on the score of a whole document or profile. Specifically, the exemplary embodiment assesses the relevance of each portion, for example, an XML-tagged field or segment, of a document or profile and then assigns the document or profile the relevance score associated with the highest or best scoring portion of the document rather than diluting the relevance score of this portion through aggregation with scores for lesser relevant portions of the document or profile. The improved performance produced by top-portion scoring is statistically significant.

Another benefit of this technique is its preservation of user confidence in the search system. In some embodiments, many database profiles list each constituent publication in its own field, thus permitting users who enter a query representing a court or publication title to find an exact match when examining their ranked results list. However, with these type profiles, complete-document scoring can mask or discount the sectional or portion-based separations of terms, thus potentially allowing proximate terms from separate titles or other portions to bolster or suggest relevance where there is little or no relevance. This could promote lesser or even irrelevant profiles to higher ranks and thus could ultimately lead users to question the accuracy and validity of the searching system.

Conclusion

In furtherance of the art, the present inventors have disclosed herein various exemplary systems, methods, and software that provide new options for effectively and efficiently targeting searches on an appropriate set of databases. One exemplary system presents online users with multiple forms of user-selectable search assistance. A first form, referred to as database discovery, provides a set of searchable database profiles based on data-sampling techniques. A second form, referred to as database navigation, is a hierarchical database directory that allows users to navigate to any desired category or subcategory and search databases or database profiles underneath the category. And, a third form, referred to as database selection, allows a user to categorize a query and presents, based on the category, a set of database choices, a set of links to specific portions of a database directory, or a set of decisions to further delineate needs.

One or more of these and/or other forms of search assistance taught by the inventors ultimately enable users to develop and execute more effective search strategies, while potentially reducing computational burdens on online search systems, and most importantly increasing user satisfaction.

The embodiments described above are intended only to illustrate and teach one or more ways of making and using the present invention, not to restrict its breadth or scope. The actual scope of the invention, which embraces all ways of practicing or implementing the teachings of the invention, is defined only by one or more issued patent claims and their equivalents.

What is claimed is:

1. A method comprising:
   receiving a query at a server, said query directed to discovering one or more databases of a plurality of databases which will provide relevant search results from a search of documents stored on the respective one or more databases, wherein the query includes one or more query terms;
   searching a set of sample-based database profiles based on the query, with each profile associated with a respective database of the plurality of databases and defined as a document representing terms or phrases and their corresponding frequencies; and
   ranking relevance of two or more of the sample-based database profiles, wherein ranking relevance includes determining a relevance score for one or more of the database profiles based on frequency of one or more of the query terms within the database profile and based on frequency of the one or more of the query terms across the set of database profiles.

2. The method of claim 1, wherein ranking relevance further includes:
   determining whether the query contains any jurisdictionally relevant terms; and
   in response to determining that the query contains no jurisdictionally relevant terms, down-weighting each database profile associated with a jurisdictionally biased database relative to ranking of other database profiles that are not jurisdictionally biased.

3. The method of claim 2, further comprising:
   identifying a set of N databases based on results of ranking relevance of the two or more database profiles, with N being a whole number; and
   searching one or more of the N databases.

4. The method of claim 2 further comprising:
   ranking the one or more databases based on a query;
   outputting a list of N ranked databases of the one or more databases, after ranking the one or more databases, wherein each of the N databases has a preceding or succeeding database in the list, and each is associated with a relevance score that has a predetermined relationship with a relevance score associated with the preceding or succeeding database.

5. A method comprising:
   receiving a query including a plurality of terms at a server, said query directed to discovering one or more databases of a plurality of databases which will provide relevant search results from a search of documents stored on the respective one or more databases;
   identifying one or more terms of the query as belonging to one or more term categories; and
   determining search results based on the query, with at least one search result associated with a relevance score based on the identification of at least one of the terms,
   wherein identifying one or more of the terms includes determining that one or more of the terms is related to a location or a legal-practice area; and
   wherein determining search results based on the query includes computing a term-frequency-and-inverse-document-frequency-based score for the one term and up-weighting the computed score in response to the determination that the one term is related to a location or a legal practice area.

6. The method of claim 5:
   wherein identifying one or more of the terms includes determining that one or more of the terms is a generic legal term; and
   wherein determining search results based on the query includes computing an inverse-document-frequency-based score for the one term and down-weighting the computed score in response to the determination that it is related to a generic legal concept.

7. The method of claim 6, wherein determining that one or more of the terms is a generic legal term includes determining whether the term is "law," "regulation," "code," "department," "cases," "reporter," or "journal".

8. The method of claim 6, wherein determining whether a term is a generic legal term includes determining utility of the term as a discriminator of one document from another similar document or one database from another database.

9. The method of claim 5 wherein determining search results based on the query includes:
   determining whether the query includes jurisdictionally specific content; and
   if the determination is that the query does not include jurisdictionally specific content, down-weighting the determined relevance of each database that is jurisdictionally biased relative to other found databases that are not jurisdictionally biased.

10. The method of claim 9, further comprising:
    determining whether to automatically execute the received query against one or more of the identified databases.

11. A method comprising:
    receiving a query at a server;
    in response to receiving the query, identifying a plurality of documents relevant to the query, where each of the documents profiles a corresponding database, with at least one of the documents having a plurality of portions; and
    determining a relevance score for each identified document, wherein determining the relevance score for each of the documents having a plurality of portions includes:
      determining a plurality of portion relevance scores, with each portion relevance score quantifying relevance of a respective one of the portions to the received query; and
      determining the relevance score for the document based on one of the plurality of portion relevance scores, with the one of the plurality of portion relevance scores associated with a most relevant one of the portions of the document.

12. The method of claim 11, wherein the query includes one or more terms, and each portion relevance score is based on an inverse document frequency of one or more of the terms.

13. The method of claim 11, wherein one or more of the portions is delineated by mark-up language tags.

14. The method of claim 11 wherein determining the relevance score for each of the documents having a plurality of portions includes:
    determining at least first and second relevance scores for a document, with the first relevance score representing relevance of a first portion of the document to a query, the second relevance score representing relevance of a second portion of the document to the query; and
    determining a relevance score for the document, with the relevance score determination substantially excluding one of the first and second relevance scores.

15. The method of claim 14, wherein the relevance score determination for the document completely excludes the one of the first and second scores.

16. The method of claim 14, wherein one or more of the portions is delineated by mark-up language tags.

17. The method of claim 14, wherein each of the documents profiles a corresponding database.

* * * * *